July 11, 1933.  R. F. BACON ET AL  1,917,225
RECOVERY OF SULPHUR
Filed Feb. 26, 1930
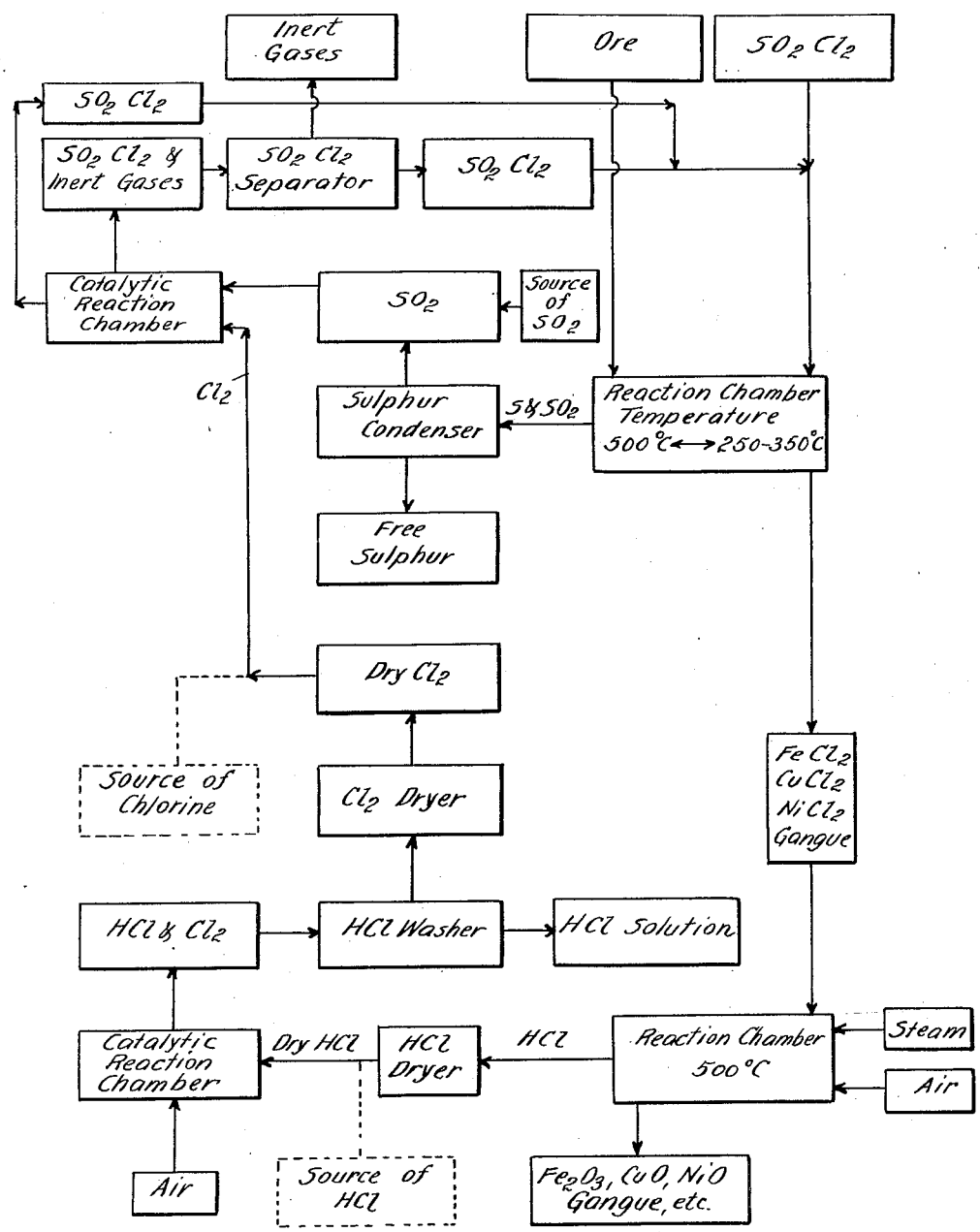
INVENTORS
Raymond F. Bacon
Rocco Fanelli
BY
Pennie, Davis, Marvin & Edmonds
ATTORNEYS Patented July 11, 1933

1,917,225

UNITED STATES PATENT OFFICE

RAYMOND F. BACON, OF BRONXVILLE, AND ROCCO FANELLI, OF NEW ROCHELLE, NEW YORK; SAID FANELLI ASSIGNOR TO SAID BACON

RECOVERY OF SULPHUR

Application filed February 26, 1930. Serial No. 431,466.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals such, for example, as copper and nickel with sulphuryl chloride for the purpose of obtaining free sulphur and/or separating iron from the mass of material undergoing treatment.

In carrying out a process in accordance with the present invention, a quantity of the iron sulphide-bearing material to be treated is subjected to the action of sulphuryl chloride under such conditions that ferrous chloride and free sulphur are formed. The process is so conducted that the sulphur produced is vaporized, leaving a residue containing the ferrous chloride together with chlorides of other heavy metals such as copper and nickel when the sulphides of such metals are present in the material being treated. The residue containing ferrous chloride is treated to recover chlorine.

During the course of the reaction between the sulphuryl chloride and the sulphides contained in the material being treated, sulphur dioxide gas is formed and passes out of the reaction chamber with the vaporized sulphur. The recovered chlorine is combined with the sulphur dioxide produced to regenerate sulphuryl chloride which is returned to the process.

The invention will be better understood from a consideration of the accompanying flowsheet and the following description of the application of the process to the treatment of ore containing pyrites and sulphides of copper and nickel.

The ore to be treated is subjected to the action of sulphuryl chloride in a reaction chamber under such conditions that ferrous chloride and free sulphur are produced. The operation is so conducted that the sulphur produced is vaporized, leaving a residue containing the ferrous chloride together with the chlorides of copper and nickel. Sulphur dioxide is formed during the course of the reaction and passes from the reaction chamber with the vaporized sulphur. A temperature below the boiling point of sulphur may be maintained in the reaction chamber and the sulphur may be swept from the reaction chamber by means of inert gases introduced with the sulphuryl chloride and/or the sulphur dioxide produced, or a temperature sufficiently high to vaporize the sulphur may be maintained and substantially pure sulphuryl chloride may be employed.

The ore is preferably introduced in a dry, finely divided condition into the interior of a rotary reaction chamber having ore charging means at one end and discharging means at the other end, and which is so constructed and operated that the ore is gradually moved from the charging end toward the discharge end. Sulphuryl chloride is introduced into the reaction chamber at the end opposite to that at which the ore is introduced and the ore and sulphuryl chloride pass through the reaction chamber in counter-current relationship, the vaporized sulphur being removed from the reaction chamber at a point near the charging end. Sulphuryl chloride may be introduced into the reaction chamber as a liquid or as a gas. Liquid sulphuryl chloride will be vaporized immediately after its introduction. The ore is preferably ground to provide particles sufficiently small to pass a 100-mesh screen in order that intimate contact of the sulphuryl chloride with the sulphide particles may be obtained.

The reaction between the sulphuryl chloride and the sulphides contained in the ore starts at a temperature of about 250° C., and proceeds most rapidly at a temperature of about 500° C. It is, therefore, advisable to maintain a temperature of about 500° C. in at least a portion of the reaction chamber. Such a temperature may be maintained in the charging end portion of the reaction chamber to insure the passage of all issuing gases through a zone in which conditions are conducive to a complete reaction.

The process is preferably so controlled that a temperature of about 500° C. is maintained near the charging end of the reaction chamber, and a temperature of about 250° C. to 350° C. is maintained near the discharge end of the reaction chamber. The admission of ore and sulphuryl chloride is so regulated that all of the sulphur liberated is vaporized and all of the sulphuryl chloride admitted is consumed. The sulphur produced is vaporized and separated from the heavy metal chlorides in the hottest portion of the reaction chamber, and the residue containing the heavy metal chlorides is discharged from the reaction chamber preferably at a temperature of about 300° C.

The gases issuing from the reaction chamber are cooled to condense the sulphur and thus separate the sulphur and sulphur dioxide. The sulphur dioxide is collected and combined with chlorine recovered from the ferrous chloride produced to regenerate sulphuryl chloride.

The hot residue containing ferrous chloride and the chlorides of nickel and copper is treated with steam in order to produce hydrogen chloride and oxides of the metals by hydrolysis. Air is admitted with the steam in order to assist the reaction by oxidation of the iron. The air and steam are preheated in order to assist in maintaining the mass at the desired reaction temperature.

The hydrolysis will take place at normal atmospheric temperatures, but the rate of reaction is too slow for practical purposes. Higher temperatures not only increase the speed of the hydrolysis but also assist in the air oxidation which takes place. The treatment of the ferrous chloride-bearing material with air and steam may be carried out satisfactorily at a temperature of from 440° C. to 600° C. Ordinarily, a reaction temperature of about 500° C. is entirely satisfactory.

The treatment of the ferrous chloride-bearing material with air and steam may be carried out conveniently in a rotary reaction chamber having charging means at one end and discharging means at the opposite end and which is so constructed and arranged that the material passes from the charging end to the discharge end during its rotation. The ferrous chloride-bearing material and the air and steam are introduced into the reaction chamber at the charging end and the resulting heavy metal oxides and hydrogen chloride are removed from the reaction chamber at the discharge end. The oxides and hydrogen chloride are preferably removed through separate discharge outlets. If the hydrogen chloride gas leaving the chamber carries considerable amounts of entrained particles of oxides it may be desirable to provide a settling chamber into which the oxides and hydrogen chloride may be introduced from the reaction chamber. Such a chamber should be maintained at a sufficiently high temperature to prevent the reverse reaction.

Means such, for example, as porcelain balls or other large pieces of inert materials are provided within the reaction chamber to prevent the chlorides from adhering to the walls of the chamber. Such means aid in stirring and grinding the chlorides and oxides as they pass through the reaction chamber.

The gases issuing from the reaction chamber contain hydrogen chloride and water vapor and they are passed through a suitable drying apparatus such, for example, as a packed tower having sulphuric acid trickling therethrough to seprate the water vapor and produce dry hydrogen chloride.

The dry hydrogen chloride is introduced into a catalytic reaction chamber with one to seven times its volume of air, depending on the concentration of the hydrogen chloride available. The air is preheated to a temperature above 420° C. and preferably to a temperature between 520° C. and 530° C. If desired, the hydrogen chloride may also be preheated.

The catalytic reaction chamber preferably consists of a tower, or a series of communicating towers packed with a material having a very large surface per unit of volume such, for example, as pumice, brick, cinders and the like. The packing material should be of such a nature that it will be inert to the reagents and the products of the reaction. The packing material is covered or impregnated with the catalyst which may be one or more chlorides or sulphates of metals such, for example, as copper and nickel. The salts may be applied as such directly to the packing material or they may be formed in place as, for example, by the action of hydrogen chloride on copper oxide which is distributed throughout the mass. Means are provided for renewing the catalytic mass as its efficiency becomes reduced. For this purpose two towers or two series of communicating towers which may be used alternately are preferably provided.

A portion of the mass of oxides resulting from the treatment of the ferrous chloride-bearing material with steam and air may be utilized as a catalytic agent for promoting the reaction between the hydrogen chloride and oxygen.

The apparatus is so constructed that the mass of catalyst-bearing material may be maintained at a temperature of from 370° C. to 400° C. The reaction between the hydrogen chloride and the oxygen of the air is exothermic and it may be so controlled as to permit the proper temperature to be maintained. The reaction will proceed at temperatures as low as 205° C., and temperatures as high as 470° C. may be used advantageously. The temperature at which the reaction is conducted will be governed largely by the nature of the catalyst. The temperature employed should be sufficiently low that excessive volatilization of the catalyst is avoided. The reaction involved in this operation does not proceed to completion. The gases issuing from the reaction chamber will consist of a mixture of hydrogen chloride, water vapor and chlorine.

In view of the fact that the reaction does not readily proceed to completion, it may be desirable to retreat the issuing gases by subjecting them to a drying operation to remove the water vapor and subsequently passing them through a second reaction chamber. This procedure may be repeated two or three or more times if desired. In carrying out the reaction between hydrogen chloride and the oxygen of air it is advisable to carefully control the proportions of air and hydrogen chloride utilized in order to avoid excessive dilution of the resulting chlorine gas.

The gases containing hydrogen chloride and chlorine are washed with water to separate the chlorine and hydrogen chloride. The resulting solution of hydrogen chloride in water may be treated in any suitable manner to recover the hydrogen chloride.

The chlorine recovered is dried and the dry gas is combined with the sulphur dioxide produced to regenerate sulphuryl chloride. The reaction between the sulphur dioxide and the free chlorine is preferably conducted at or below normal atmospheric temperatures in the presence of a suitable catalyst such, for example, as activated charcoal. The regenerated sulphuryl chloride may thus be obtained in the form of a liquid. The regenerated sulphuryl chloride is returned to the process for the treatment of additional ore.

As a result of the treatment of the ferrous chloride-bearing material and the hydrogen chloride with air, considerable quantities of inert gases such as nitrogen are introduced into the system and must be eliminated to avoid excessive dilution. The inert gases introduced into the system will be mixed with the chlorine gas which is recovered and which is combined with the sulphur dioxide produced to regenerate sulphuryl chloride. These gases will be eliminated as a result of the production of liquid sulphuryl chloride. The inert gases may be passed through a suitable separator to recover entrained particles or globules of sulphuryl chloride.

The process may be conducted continuously. A fresh source of chlorine, in the free state or combined in the form of hydrogen chloride or sulphuryl chloride, may be provided to compensate for chlorine losses due to leakage and the production of nickel and copper chlorides. In the event that a source of chlorine or hydrogen chloride is provided, an additional source of sulphur dioxide must be provided.

We claim:

1. The method of treating material containing iron sulphide which comprises subjecting the material to the action of sulphuryl chloride under such conditions that ferrous chloride and elemental sulphur are produced and the sulphur is vaporized, treating the ferrous chloride to recover chlorine, and returning the chlorine thus recovered to the process.

2. The method of treating material containing iron sulphide which comprises subjecting the material to the action of sulphuryl chloride under such conditions that ferrous chloride and elemental sulphur are produced and the sulphur is vaporized, treating the ferrous chloride to produce hydrogen chloride, treating the hydrogen chloride to recover chlorine, and returning the chlorine thus recovered to the process.

3. The method of treating material containing iron sulphide which comprises subjecting the material to the action of sulphuryl chloride under such conditions that ferrous chloride and elemental sulphur are produced and the sulphur is vaporized, subjecting the ferrous chloride to the action of air and water vapor to form hydrogen chloride, treating the hydrogen chloride to recover chlorine, and returning the chlorine thus recovered to the process.

4. The method of treating iron sulphide-bearing material which comprises subjecting the material to the action of sulphuryl chloride under such conditions that ferrous chloride, sulphur dioxide and elemental sulphur are produced and the sulphur and sulphur dioxide are vaporized, collecting the sulphur dioxide, treating the ferrous chloride to recover chlorine, and combining the chlorine thus recovered with the sulphur dioxide produced to regenerate sulphuryl chloride.

5. The method of treating iron sulphide-bearing material which comprises subjecting the material to the action of sulphuryl chloride under such conditions that ferrous chloride, sulphur dioxide and elemental sulphur are produced and the sulphur and sulphur dioxide are vaporized, collecting the sulphur dioxide, treating the ferrous chloride to form hydrogen chloride, treating the hydrogen chloride to recover chlorine, and combining the chlorine thus recovered with the sulphur dioxide produced to regenerate sulphuryl chloride.

6. The method of treating iron sulphide-bearing material which comprises subjecting the material to the action of sulphuryl chloride under such conditions that ferrous chloride, sulphur dioxide and elemental sulphur are produced and the sulphur and sulphur dioxide are vaporized, collecting the sulphur dioxide, subjecting the ferrous chloride to the action of air and water vapor at an elevated temperature to produce hydrogen chloride, treating the hydrogen chloride to recover chlorine, and combining the chlorine thus recovered with the sulphur dioxide produced to regenerate sulphuryl chloride.

In testimony whereof we affix our signatures.

RAYMOND F. BACON.
ROCCO FANELLI.